US010486331B1

(12) United States Patent
Maltese et al.

(10) Patent No.: US 10,486,331 B1
(45) Date of Patent: Nov. 26, 2019

(54) DEVICE AND PROCESS FOR FABRICATING AESTHETIC WALL COVERINGS

(71) Applicants: Daniel Maltese, Agoura Hills, CA (US); Scott Pitters, Hollywood, CA (US)

(72) Inventors: Daniel Maltese, Agoura Hills, CA (US); Scott Pitters, Hollywood, CA (US)

(73) Assignee: Pulp Art Surfaces LLC, Studio City, CA (US)

( * ) Notice: Subject to any disclaimer, the term of this patent is extended or adjusted under 35 U.S.C. 154(b) by 182 days.

(21) Appl. No.: 15/833,599

(22) Filed: Dec. 6, 2017

Related U.S. Application Data

(63) Continuation of application No. 14/050,026, filed on Oct. 9, 2013, now abandoned, which is a continuation-in-part of application No. 13/410,481, filed on Mar. 2, 2012, now abandoned.

(51) Int. Cl.

| | |
|---|---|
| ***B29C 33/38*** | (2006.01) |
| ***B28B 7/22*** | (2006.01) |
| ***E04F 21/04*** | (2006.01) |

(52) U.S. Cl.
CPC ................ *B28B 7/22* (2013.01); *E04F 21/04* (2013.01)

(58) Field of Classification Search
CPC ...................... B29C 33/3814; B29C 2033/385
See application file for complete search history.

(56) References Cited

U.S. PATENT DOCUMENTS

| | | | | | |
|---|---|---|---|---|---|
| 2,920,701 | A * | 1/1960 | Wells | D21J 7/00 | 162/392 |
| 7,582,190 | B2 * | 9/2009 | Salm | D21J 3/00 | 162/218 |
| 2002/0121157 | A1 * | 9/2002 | Knott | B22D 25/005 | 75/392 |

* cited by examiner

*Primary Examiner* — James Sanders
(74) *Attorney, Agent, or Firm* — David Kleiman

(57) ABSTRACT

A tool for manufacturing a molded pulp wall covering is disclosed. The tool includes a flat tool base, a flat screen attached to the tool base, and a patterned grid that is removably attached to the tool base in a position over the flat screen. The shape of the removable attached patterned grid is used to shape the molded pulp wall panel produced by the tool. Different removable patterned grids may be used on the same flat tool base to produce wall panels with different shapes and patterns.

10 Claims, 9 Drawing Sheets

DEVICE AND PROCESS FOR FABRICATING AESTHETIC WALL COVERINGS

This application is a continuation of U.S. patent application Ser. No. 14/050,026 filed on Oct. 9, 2013, which was a continuation-in-part of U.S. patent application Ser. No. 13/410,481 filed Mar. 2, 2012, the benefit of priority for each of the aforementioned applications being claimed here and the full contents of each of which are hereby incorporated by reference.

TECHNICAL FIELD

The present invention relates to the field of wall and surface coverings, and more particularly to a method of making a three-dimensional wall covering having aesthetic features.

It is known that Earth's natural resources are limited and continue to be depleted over time. There are also environmental considerations that must be taken into account in the production, use and disposal of certain materials and products. It is estimated that in the United States of America alone, more than 200 million tons of commercial and residential rubbish is generated each year and must be disposed or reused.

A large amount of the commercial and residential rubbish generated is paper, newspaper, print and paperboard, which is biodegradable and recyclable, which means that it can be kept out of landfills, thus extending the lives of those landfills. The Environmental Protection Agency estimates that about 36% by weight of all municipal solid waste in the United States is paper, newspaper, print and paperboard, most of which may be recycled. Recycled paper and newspaper have been used for years to generate products such as copier paper and corrugated boxes, for example. The generally recognized terms for the combination of recycled paper, paperboard and newspaper that is used to make such products are "molded pulp" and "molded fiber."

Consumer products made from molded pulp include egg and fruit crates and have been available for many years in the packaging industry. Molded, fibrous, biodegradable products are also used to produce molded fiber planters and gardening products. Such products are actually bio-nutrients and are much more healthful to work with rather than using plastics, fiberglass or resins, which are the most commonly used materials. The use of molded pulp also saves trees and reduces the use of fossil fuels.

The use of molded pulp, although effective as environmentally friendly materials, is somewhat limited in the range of products that can be made from it. Molded paper products, while not generally intended for permanent structures in buildings, could be advantageously used in residential and commercial facilities as a "three-dimensional wall paper," in that it may be changed out periodically as desired.

In the entertainment business, backgrounds for sets and displays in theme parks, stage shows, television shows and motion pictures, materials for making props and covering walls, floors, ceilings, and other surfaces to create a certain ambiance or theme, are typically made of such materials as vacuformed plastic, fiberglass, wood framing, wire, concrete, plaster and paint. Use of these materials can be labor intensive and expensive, and the resulting products may not be fully recyclable or environmentally friendly. Also, since props and backgrounds in motion pictures and television programs are frequently used only once, use of such materials can represent a significant production expense. Molded pulp products may replace wood, concrete, plastic (vacuformed) products, fiberglass products and resin products that are commonly used.

It would be desirable, therefore, to provide an environmentally friendly wall covering product that is biodegradable and recyclable, yet functional and aesthetic, that can be inexpensively manufactured using existing machinery and manufacturing techniques, and is reusable.

It would also be desirable to produce these products using recycled molded paper (molded pulp), since most props used are not required to be load bearing or meet many commercial or residential regulations.

It would also be desirable to provide a versatile, reusable tool for producing aesthetic wall coverings that could be used for a variety of designs without the need to produce an expensive, labor-intensive tool for each different design of wall covering.

SUMMARY OF THE INVENTION

The present invention is directed to patterned elements that form wall coverings when one or more of such elements are arranged adjacent one another. The elements may be made from molded pulp, paper and fibrous materials or any combination thereof.

The wall coverings of the present invention are made of environmentally friendly and recyclable materials and may be provided in various shapes, sizes and thicknesses, and in an almost limitless variety of surface patterns which simulate brick, flag stone, rocks, architectural ornamentation and the like. These elements are functional, aesthetically pleasing, cost effective and provide a very desirable alternative to making less environmentally friendly and inexpensive wall coverings.

The resulting wall covering, which may comprise one or more elements, includes aesthetically pleasing patterns on a display surface, which may be shaped, sculpted, sanded, embossed or printed on them and can be easily attached to and fitted on an existing surface without the need for using expensive and/or toxic adhesives. Such coverings would also provide a high fire rating. The wall coverings that are produced according to the method disclosed herein may also find use as acoustical elements in studios, theaters and the like or in drop ceilings.

According to one aspect of the present invention, a method for the manufacture of aesthetic wall coverings includes the steps of: preparing a mockup of the wall covering with the desired surface pattern; creating a tool from the mockup, preparing a slurry of recycled paper, newspaper, paperboard and water; creating the basic wall covering by the use of slush molding of the slurry to shape the wall covering and eliminate the water from the slurry; drying the wall covering; cutting the covering to create one or more elements; and creating a surface pattern by finishing, sculpting, sanding, embossing or printing details on the display surface of the element(s).

There are at least four types of pulp molding processes that are generally known. For the method of producing the wall coverings according to the present invention, the preferred type of pulp molding is Slush Molding (also known as Thick-Wall Molding). Products produced using slush molding generally have surfaces that are very rough on one side and moderately rough (but not planar) on the opposite side. The tool that is created according to the method of manufacture disclosed herein is used in conjunction with a copper screen; the copper screen is shaped to conform to the shape of the tool during the slush molding process. The copper screen allows for the water in the slurry to be removed by pressure as well as heat during the slush molding process.

Typically, products made from slush molding are used for edge protectors, heavy packaging, and molded pulp pallet trays. The use of products made by slush molding of recovered paper slurries for aesthetic purposes is heretofore unknown because of the characteristics of the resulting products. Die or CNC cutting of the elements used to form the wall covering according to the present invention has been found to allow for adjacent elements to be better fitted together and reduces or eliminates the need to caulk the joints between adjacent elements or coverings.

Surface finishing of the front or display surface of the elements of the wall coverings according to the present invention includes shaping and texturing procedures, which may include, but not be limited to, sanding, carving, sculpting, stamping, printing and embossing to attain the desirable surface features, contours and textures.

The wall coverings produced in accordance with the method according to the present invention may be attached to an existing surface or wall using conventional fasteners such as screws, nails or staples. The wall coverings according to the present invention do not require the use of expensive and/or toxic adhesives to mount on a wall or surface, as do molded pulp coverings produced using other types of pulp molding. As previously discussed, slush molding, as used during the manufacturing method according to the present invention, produces wall coverings with uneven front and rear surfaces, which does not readily facilitate the use of adhesives for wall mounting.

Once the front or display surface(s) of the elements of the wall covering have been finished to create a desired pattern or contour, the final colors and surface features may be digitally printed on the front surface. The elements of the wall covering can then be attached to a surface to form the covering for display. One or more wall coverings, each having one or more elements, may be arranged together to for a pattern on the wall surface to which they are attached.

The present invention solves problems experienced with the prior art by providing a cost effective, environmentally friendly wall covering product that is biodegradable but aesthetically pleasing and can be made using existing machinery and manufacturing procedures.

According to another aspect of the present invention, an improved tool for fabricating pulp molded aesthetic wall coverings is provided. In the conventional method of fabrication of the aesthetic wall coverings, a three-dimensional shaped poured tool base is created from a model which contains the various shapes of the design surface of the wall covering, such as bricks, stone, etc. Creation of the shaped poured tool base used in the conventional method of fabrication is labor intensive. Perforations are drilled in the base for water to be vacuumed out of the pulp slurry during the pulp molding process.

A screen is then placed on the shaped poured tool base and then manipulated, shaped, cut and contoured to fit the three-dimensional pattern of the poured tool base and the wall covering design. Such contouring is time consuming and labor intensive and much of it must be done by hand. The screen is then physically attached to the shaped poured tool base by means of soldering between the screen and conventional connectors, such as screws, attached to the tool base. The screen will retain the pulp while water is suctioned out of the holes during the pulp molding process.

In this conventional method of fabrication, there is nothing on the face of the screen. The finished part (wall covering) receives its desired three-dimensional shaped profile from the shaped poured tool base which must be created specifically and separately for each design. The screen and shaped poured tool base together form the tool that is used in the pulp molding process to form the aesthetic wall coverings.

With a vacuum mechanism connected to the tool, the tool is disposed in a vat of slurry. The water in the slurry is drawn through the perforations forming a layer of fibrous slurry against the surfaces of the tool as is known in the slush molding process.

The inventors have found that better definition and detail in aesthetic wall coverings replicating real materials such as cement block, brick, tile and other relatively flat geometric designs may be created more efficiently, quickly and less expensively using a new, versatile and novel tool for producing aesthetic wall coverings using the slush molding technique. In this aspect of the present invention, a one time flat (non-shaped) perforated porous tool base is combined with a flat screen to create the new and improved tool. The porous tool base could be made of steel, aluminum or a pourable material, for example.

A patterned grid is then placed on and attached to the face of the screen. The patterned grid is comprised of grid members arranged in desired patterns to replicate cement block, brick, tile and other relatively flat geometric designs. As the process continues, the fibrous slurry in the slurry vat forms during vacuuming and the slurry builds up on the screen as with the conventional mold but also bridges across the grid. The rear surface of the aesthetic wall coverings formed using the tool according to the present invention will have a flat rear surface, instead of a non-flat profile, that will then lay flat on the conveyor belt that conveys the parts through the drying oven during the slush molding process. The use of a patterned grid in this process solves the big problem with other methods of making aesthetic coverings using recycled pulp, that being surfaces that sag and thus looking unrealistic.

The buildup of material on the grid is not as thick on the forming screen, which advantageously provides finished wall coverings which are more flexible and may be attached to a curving wall, are flatter for digital printing, and flatter for shipping and storing, thus saving space. The grid enables the formation of aesthetic details, for example, the grout lines in a brick or block wall aesthetic wall covering. The porous tool base, the flat screen, the patterned grid, and the pulp surrounding of the grid members in combination comprise the improved tool according to the present invention.

A major advantage of the tool according to the present invention is that the porous tool base and screen can be used to create different aesthetic designs by removing a grid and attaching a new grid having a different arrangement of grid members. This versatile tool provides flexibility and lowers costs by removing the necessity of having separate distinct tools for each different aesthetic design of wall covering.

The inventors have also found that by adding a surplus of pulp surrounding the various patterned grids beyond the intended finished die-cut patterned design of the wall covering solves the problem of parts warping and "potato chipping" as they free dry on the conveyor belt going through the drying oven. The dimensions of the dried parts have to be accurate in order to die cut them properly. Creating aesthetically correct and pleasing wall coverings using slush molding raises problems not found in making the usual packaging products made by slush molding for the packaging industry, in that the wall coverings must fit together precisely with high tolerance in dimensions and detail.

Further objects and advantages of this invention will become more apparent from the following description of preferred embodiments of the invention, which, taken in conjunction with the accompanying drawings, will illustrate, by way of example, the principles of the invention.

BRIEF DESCRIPTION OF THE DRAWINGS

The foregoing and other aspects and advantages of the present invention will be better understood from the following detailed description of exemplary embodiments of the invention with reference to the drawings in which.

DETAILED DESCRIPTION OF THE INVENTION

In the following description of the invention, reference is made to the accompanying drawings, which form a part thereof, and in which is shown, by way of illustration, exemplary embodiments illustrating the principles of the wall covering and method of manufacturing of the present invention and how it may be practiced. It is to be understood that other embodiments may be utilized to practice the present invention and structural, functional, and procedural changes may be made thereto without departing from the scope of the present invention.

A wall covering in accordance with a first embodiment of the present invention is illustrated in FIGS. 1-4 and is generally designated by the numeral 10. Wall covering 10 may include one or more elements 12 that can be used together to form a desired pattern on a wall 24. It will be understood by those having ordinary skill in the art that the wall covering 10 may be used in conjunction with a vertical wall 24 as well as on ceilings, floors or angled surfaces as well.

Figure 1:
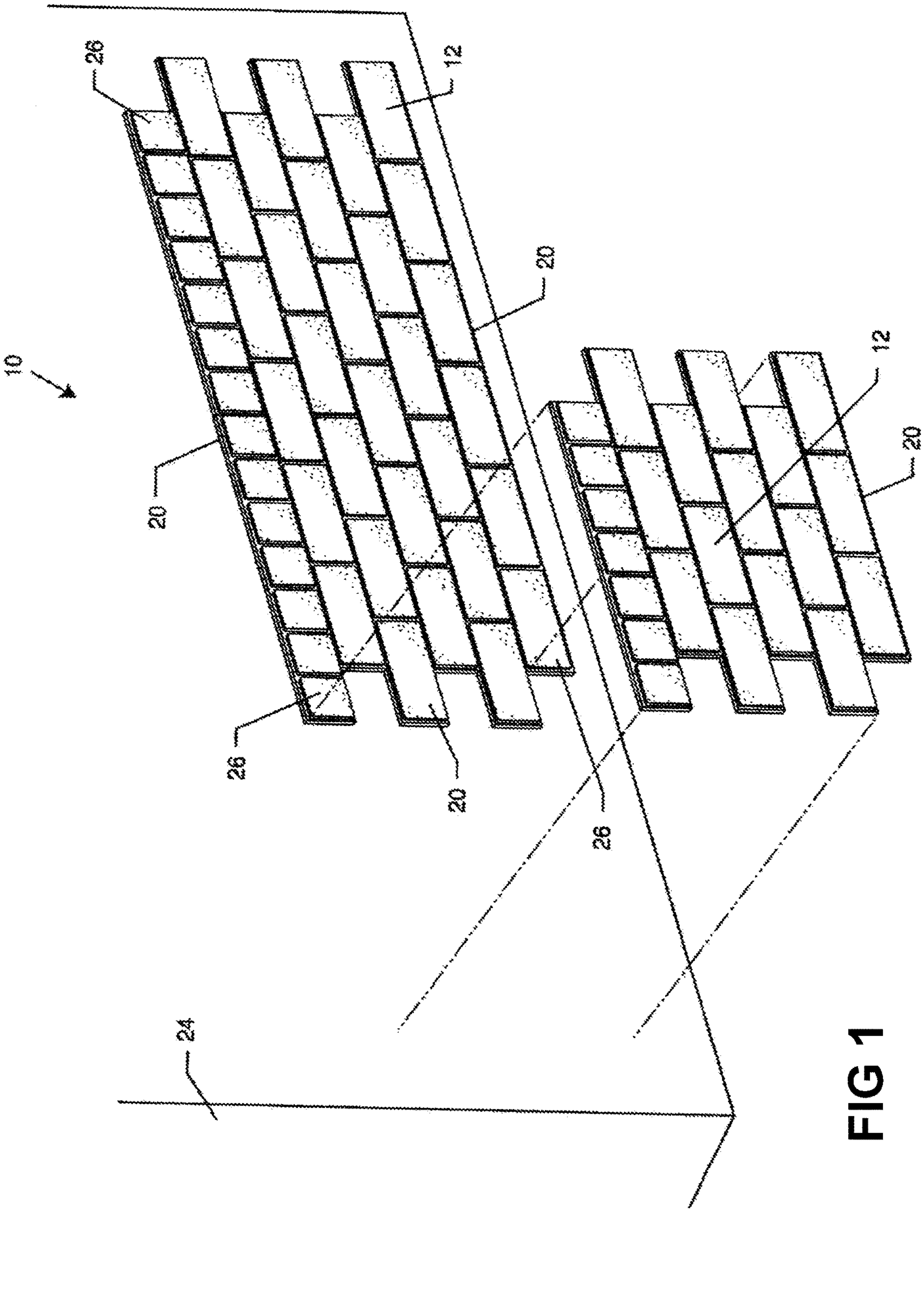
FIG. 1 illustrates perspective view of the elements forming an exemplary wall covering according to the present invention.
Figure 2:
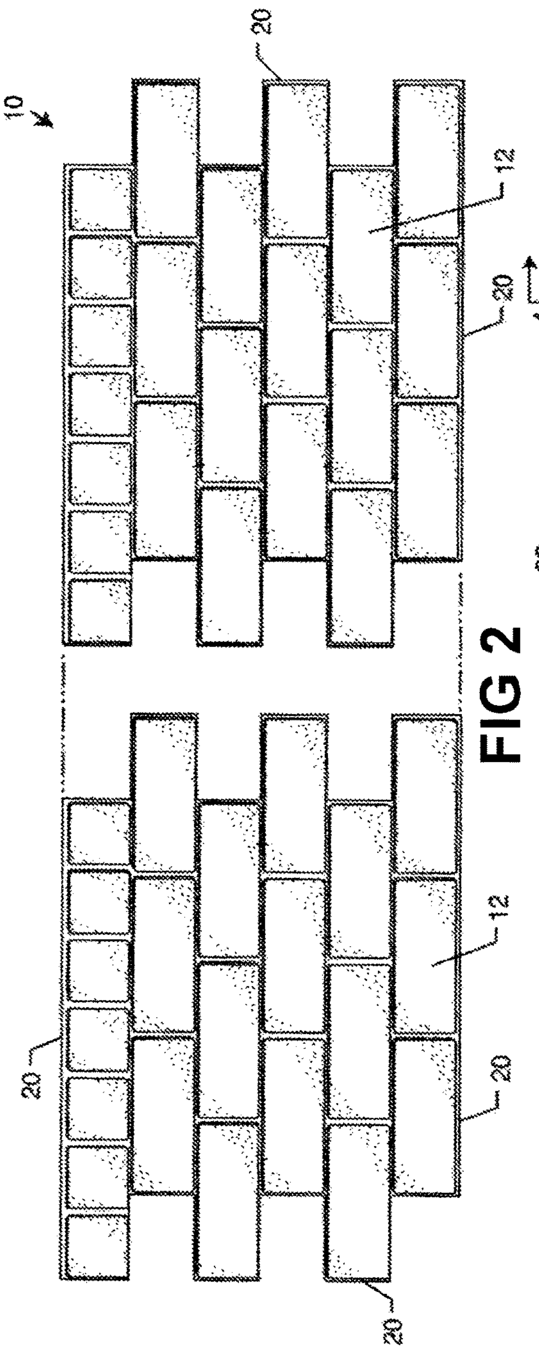
FIG. 2 illustrates a front elevational view of the elements forming an exemplary wall covering according to the present invention.
Figure 3:
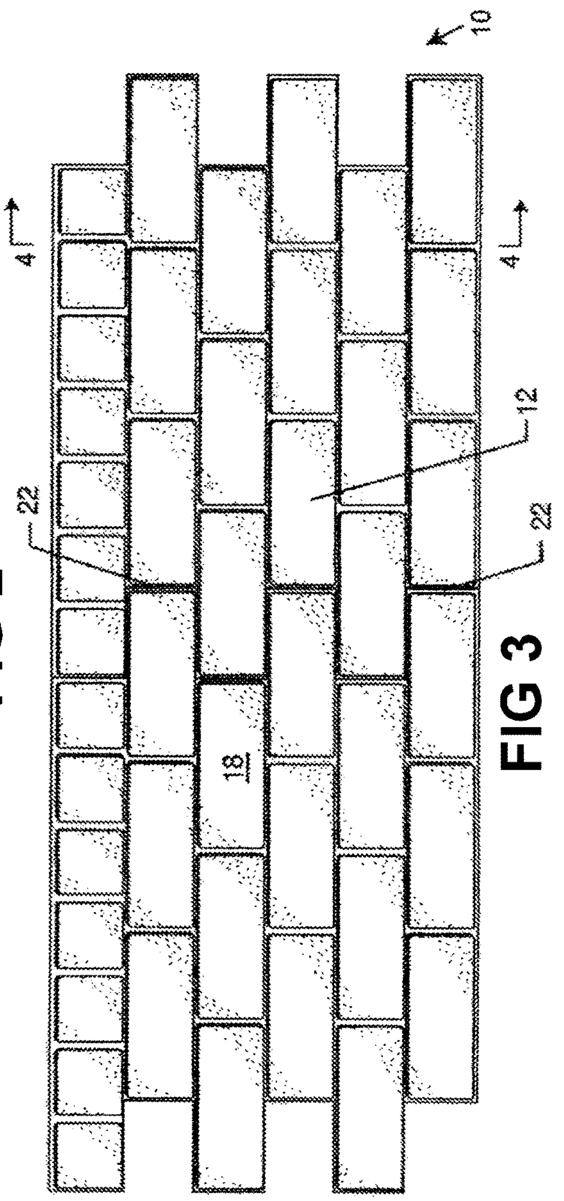
FIG. 3 illustrates a front elevational view of an exemplary wall covering according to the present invention.
Figure 4:
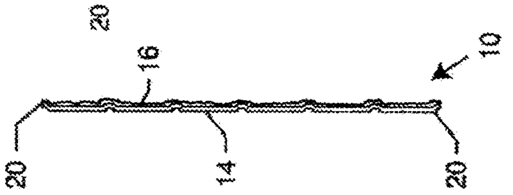
FIG. 4 a sectional side view of an exemplary wall covering according to the present invention taken at line 4-4 in FIG. 3.

Each element 12 includes front or display surface 14, rear surface 16 and edges 20. Display surface 14 includes surface pattern 18, which, in the example illustrated in FIGS. 1-4, depicts a brick surface. Adjoining elements 12 are fitted together at joints 22, as best illustrated in FIG. 3, such that no gaps appear between adjacent elements 12.

The wall coverings according to the present invention and as depicted in the drawing figures are not intended to be in any way limited in size, shape or patterns to those illustrated. It will be understood by those having ordinary skill in the art that wall coverings according to the present invention may be of various shapes and patterns.

Figure 5:
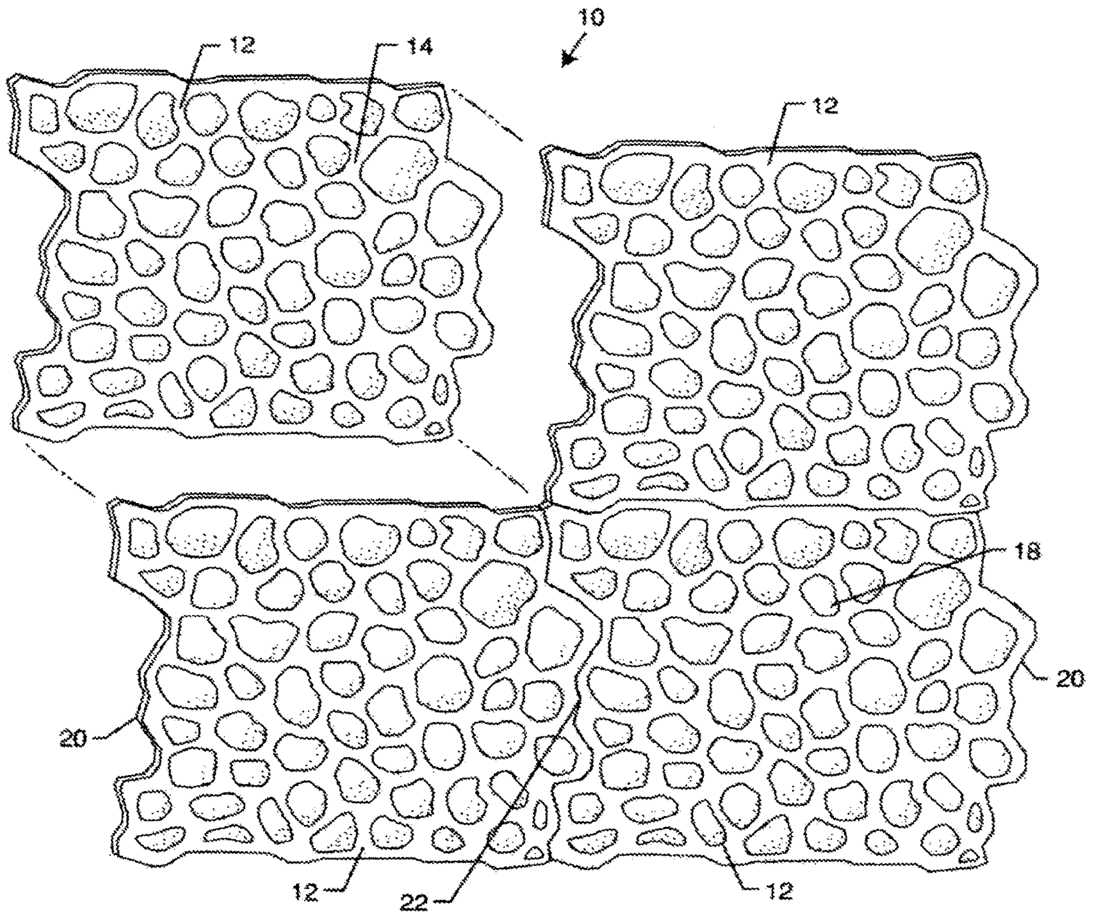
FIG. 5 illustrates a front elevational view of the elements forming an alternative embodiment of an exemplary wall covering according to the present invention.

FIG. 5 illustrates wall covering 10 having a surface pattern 18 that simulates a rock wall. Surface pattern 18 may be created by a number of methods of surface preparation on display surface 14, such as sanding, carving, or embossing, and other details may be painted or digitally printed on display surface 14.

A wall covering 10 according to the present invention may be made with a variety of thicknesses depending on the application and can be controlled by the slush molding process. The fabrication of a wall covering 10 according to the present invention by the use of slush molding results in a wall covering 10 having a rough uneven display surface 14 and a moderately rough uneven rear surface 16. Such a configuration is not conducive to the use of conventional adhesives to attach wall covering 10 to surface 24. Wall covering 10 and the elements 12 that are used to form it may be attached to surface 24 by means of conventional fasteners such as nails, screws, staples or tape.

Figure 6:
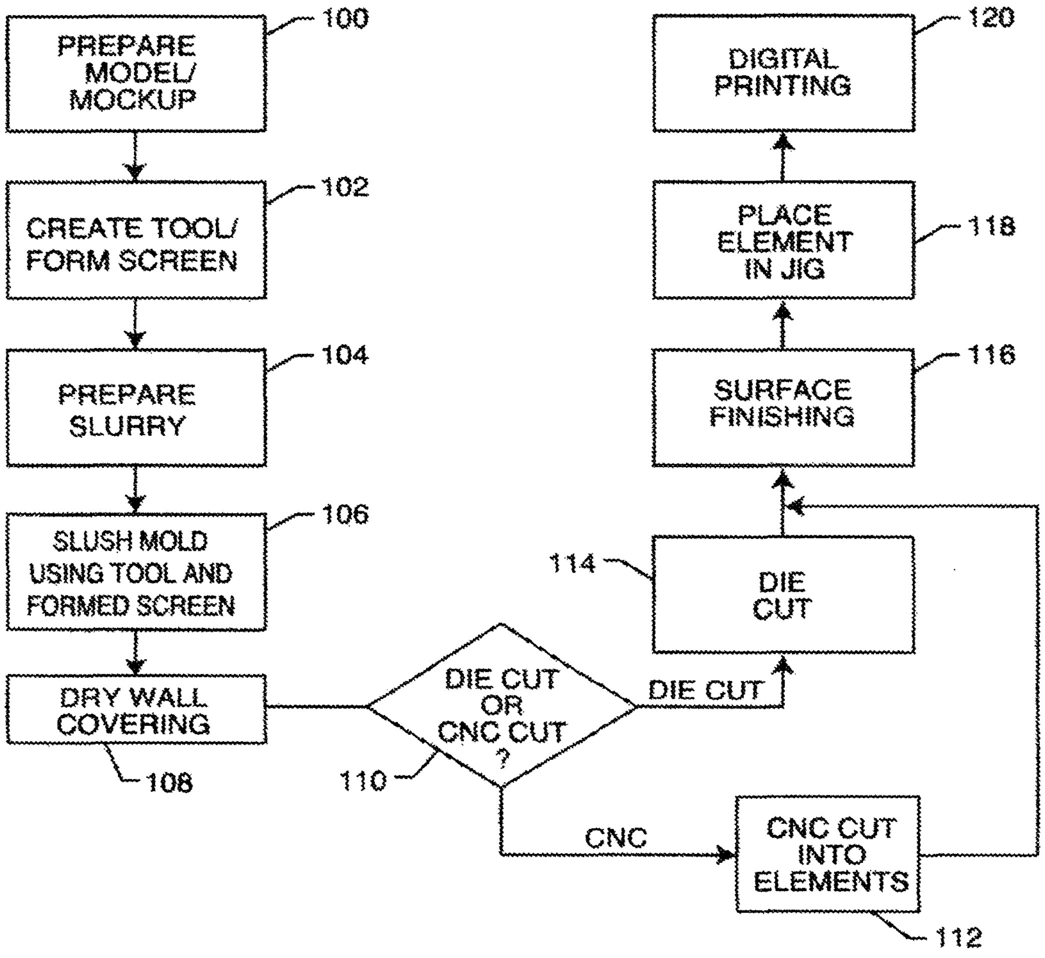
FIG. 6 illustrates a block flow diagram of the steps used in the manufacturing method according to the present invention.
Figure 7:
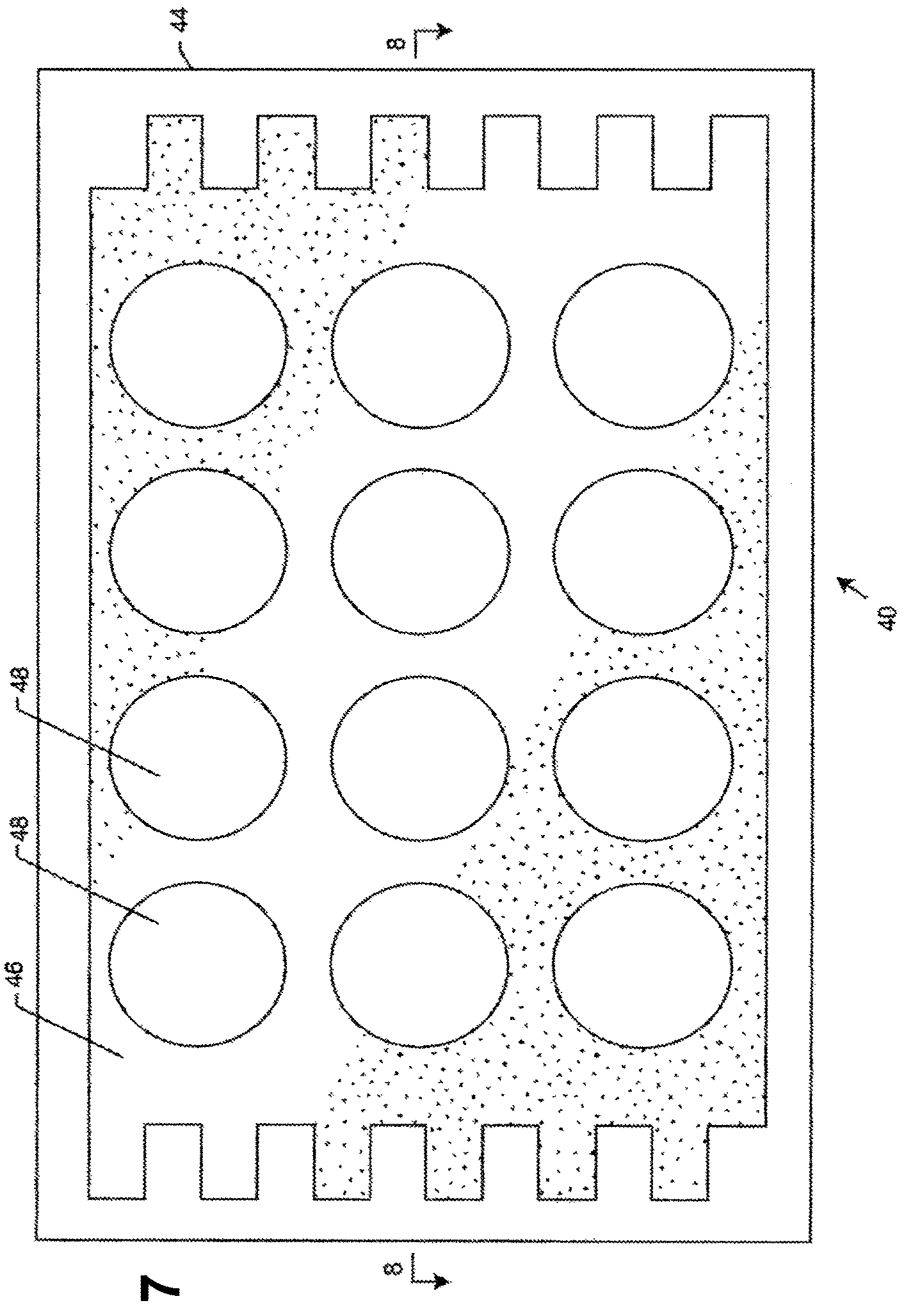
FIG. 7 illustrates a block flow diagram of the steps used in the manufacturing method according to the present invention.
Figure 8:
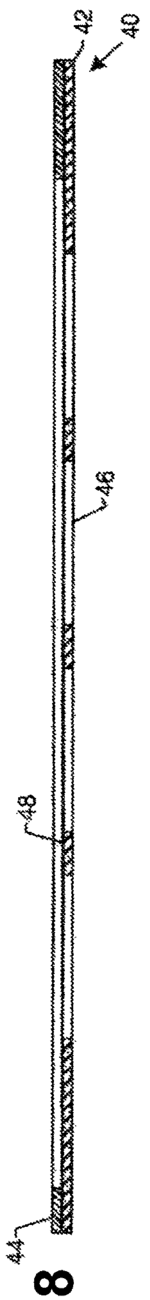
FIG. 8 illustrates a sectional side view of a jig taken along line 8-8 of FIG. 7.

FIG. 6 illustrates the steps of the method of manufacturing of a wall covering 10 in accordance with the present invention. The method of manufacturing incorporates the use of a specially designed jig 40, which is illustrated in FIGS. 7 and 8. Jig 40 includes a support surface 42, which secures and positions each element 12 as it undergoes digital printing on a flatbed printer during manufacturing. Support surface 42 includes a shaped perimeter 44 that is designed to follow the edges of element 12. Preferably support surface 42 is a foam core material to provide a close fit between jig 40 and element 12. Jig 40 makes the element 12 air tight during printing and provides consistent positioning of the elements and holds them flat.

Lower surface 46 of jig 40 is stretched and fixed to support surface 42. Preferably, lower surface 46 is made of a thin flexible plastic, such as Sintra. Lower surface 46 includes openings 48 to allow for suction to hold an element 12 stable and flat during printing. The printer used during the method according to the present invention is most effective on flat surfaces, and jig 40 allows the printer to print more effectively on display surface 14. Without the use of jig 40, the printer used during the method of manufacturing according to the present invention could be damaged, which would be expensive to repair.

Once it is determined what the desired appearance of a wall covering 10 should be, the first step 100 is to prepare a mockup or model of the desired wall covering 10 or element 12. From the model, at step 102, a molding tool and conforming screen are prepared. The tool is generally made of a composite material and includes the desired surface pattern depicted by the mockup. The screen is generally of a porous copper construction and is shaped to conform to the surface pattern formed by the tool. It may be necessary, for certain surface patterns, to remove portions of the screen to preserve the integrity of the screen and the surface pattern.

At step 104, a slurry blending recycled paper, cardboard and water is prepared. At step 106, the slurry is pumped into a vat in the slush molding machine where the tool is immersed in the slurry. As the level of the tool rises, the slush molding machine uses suction to remove the slurry water from the tool and screen. Thickness of the wall covering 10 is determined during this step by monitoring and controlling the amount of slurry injected into the tool and screen.

At step 108, once the slush molding process is completed, wall covering 10 is removed from the slush molding machine and conveyed to a dryer. At step 110, the user then makes a decision whether to divide wall covering 10 into a plurality of elements 12, either by use of Computer Numerical Control (CNC) cutting, step 112 (which may be by means of a water jet, an oscillating knife, a rotating blade or a laser), or alternatively, by die cutting, step 114. Use of the cutting step 112 or 114 forms edges 20 that configure joints 22 so that elements 12 fit closely together, leaving no gaps, and does not require joints 22 to be caulked.

At step 116, display surface 14 of each element 12 is finished and the surface pattern 18 is formed by using a variety of procedures, such as sanding, carving, embossing or the like to create the desired and realistic surface pattern 18 envisioned at the beginning of the process.

At step 118, each element 12 is secured in jig 40 in preparation for printing. Each jig 40 must be designed for a particular element 12 and surface pattern 18.

Step 120 in the production process may include digitally printing colors and surface features on display surface 14 to provide further details to surface pattern 18.

The completed elements 12 of wall covering 10 can be mounted to wall 24 by use of conventional fasteners 26, such as screws, nails, staples, tape, Velcro and the like, form wall covering 10.

Figure 10:
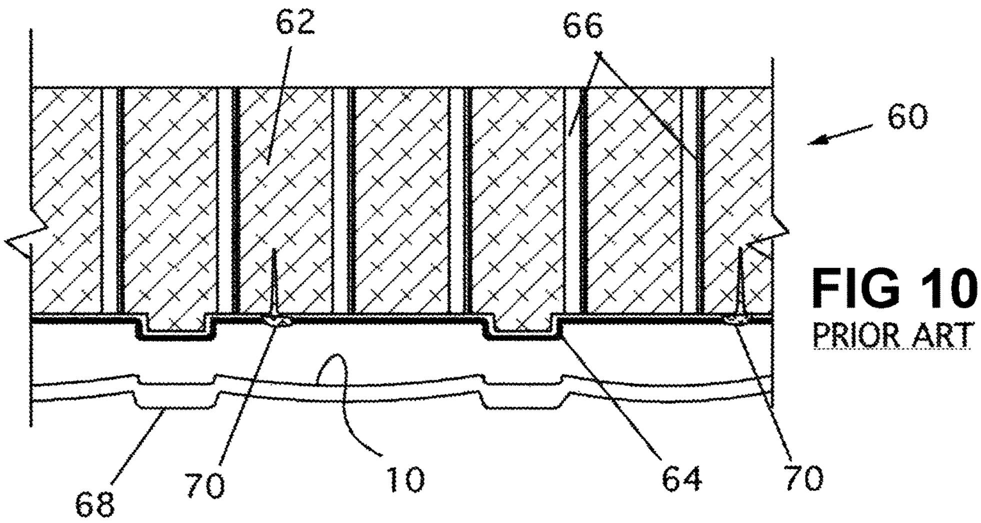
FIG 10 PRIOR ART
FIG. 10 illustrates a partial sectional view of a fabrication tool according to the prior art.
Figure 9:
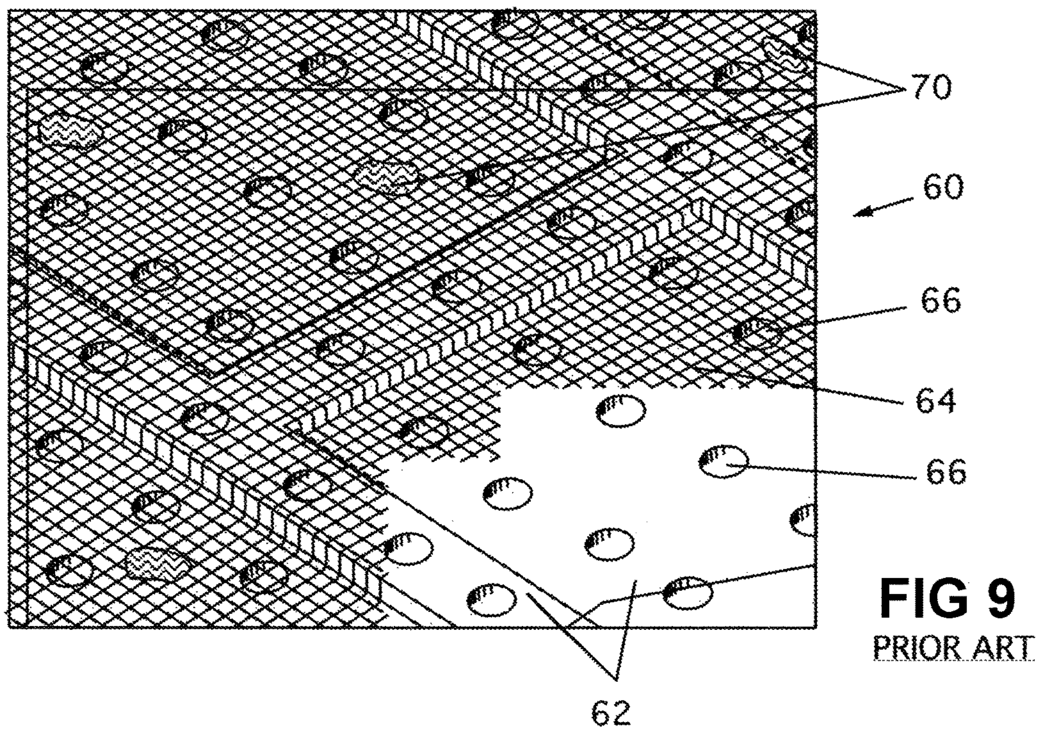
FIG 9 PRIOR ART
FIG. 9 illustrates a perspective view of a fabrication tool according to the prior art.
Figure 12:
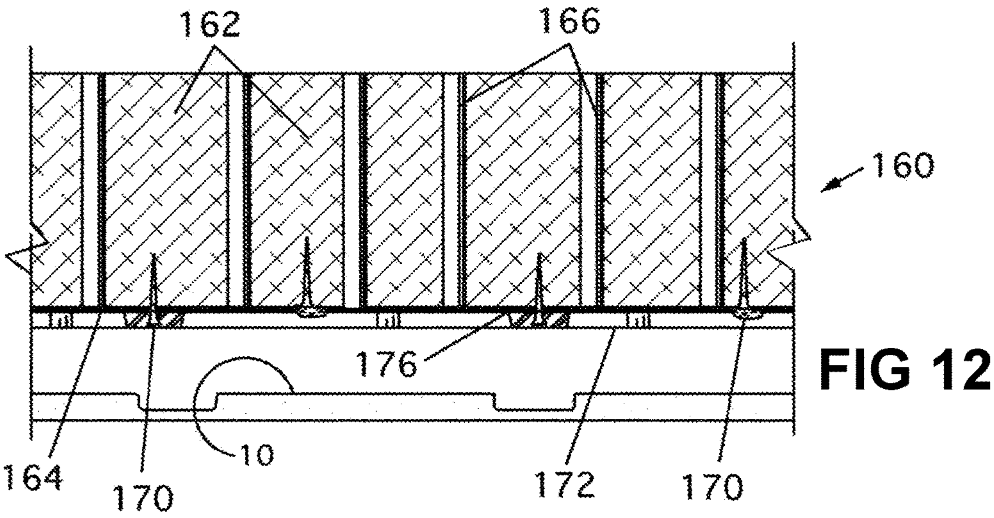
FIG. 12 illustrates a partial sectional view of a fabrication tool according to the present invention.
Figure 11:
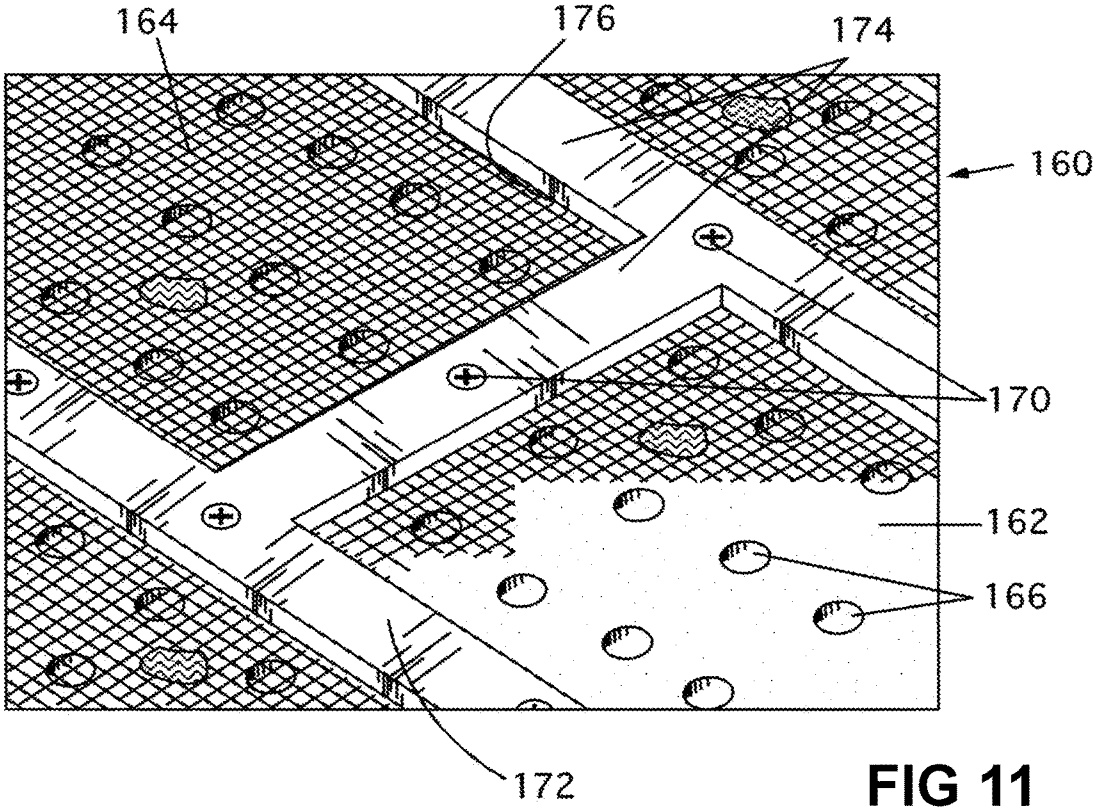
FIG. 11 illustrates a perspective view of a fabrication tool according to the present invention.
Figure 13:
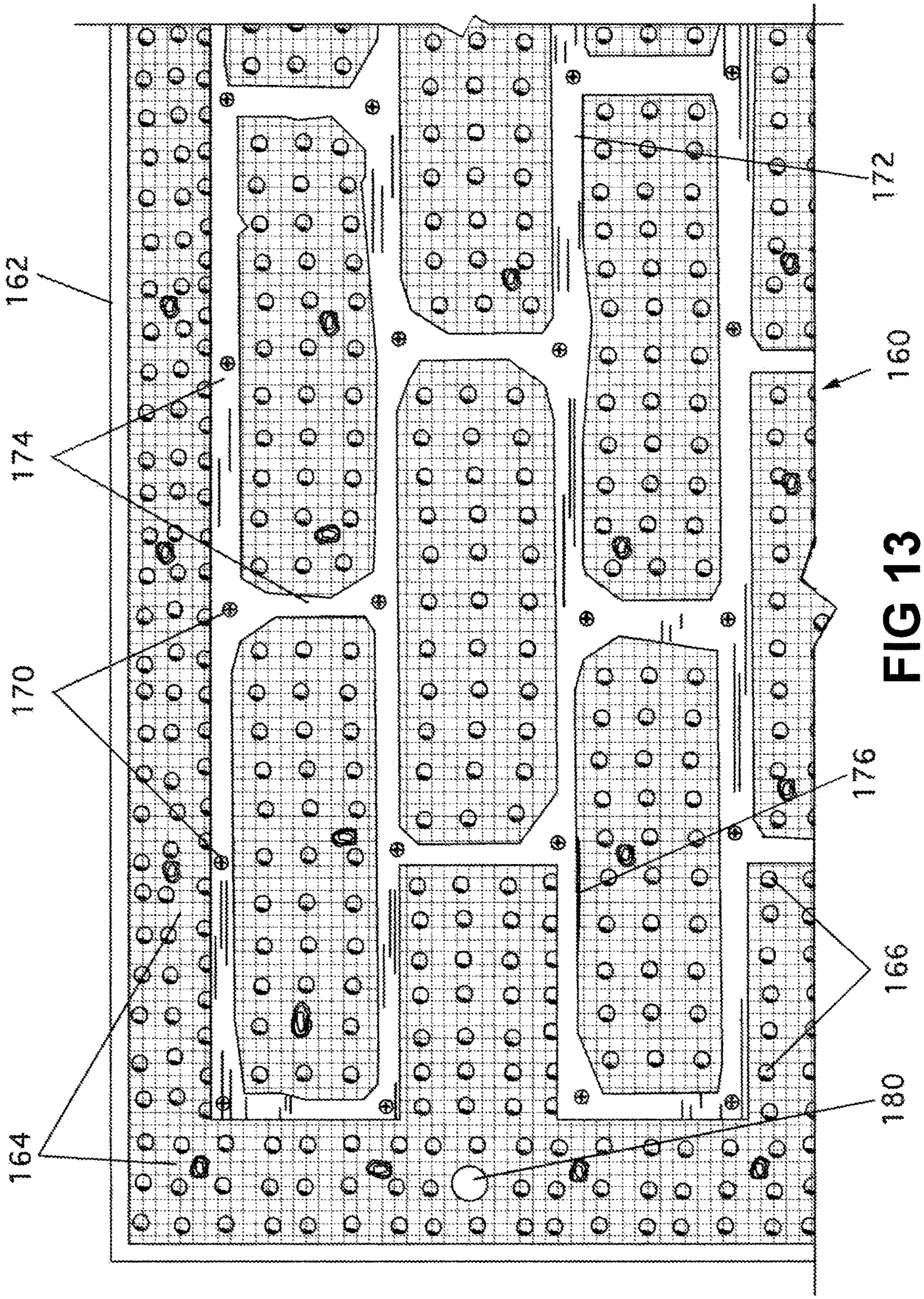
FIG. 13 illustrates a plan view of a patterned grid for use in conjunction with a fabrication tool according to the present invention.

In another aspect of the present invention, the inventors have developed a reusable and interchangeable tool for use in the slush molding process to create aesthetic wall coverings 10. The conventional tool 60, also noted as prior art, is illustrated in FIGS. 9 and 10. A shaped poured tool base 62 includes drain holes 66 for water removal during the slush molding process. Screen 64 is configured to fit the various shapes in tool base. Screen 64 and poured tool base 62 together form the conventional tool 60 that is used, Such contouring is time consuming and labor intensive and much of it must be done by hand. Screen 64 is then physically attached to the shaped poured tool base 62 by means of soldering between the screen and conventional connectors 70 inserted in shaped poured tool base 62, such as screws, attached to the tool base 62. Screen 64 will retain the pulp while water is suctioned out of the drain holes 66 during the pulp molding process.

Conventional tool 60 is specifically made for a specific design of wall covering 10. For example, if a wall covering 10 simulating bricks is desired, tool 60 may be used only for such a design.

FIGS. 11-14 illustrate an embodiment of new improved tool 160 for use in the slush molding process in accordance with the present invention. Tool 160 includes a flat porous tool base 162 having drain holes 166. The porous tool base 162 could be made of steel, aluminum or a pourable material, for example. Screen 164 is attached to porous tool base 162 by means of conventional methods, such as soldering, conventional connectors, such as screws inserted in porous tool base 162. Note that in tool 160, screen 164 is not manipulated to conform to particular shapes but is instead is flat when attached to porous tool base 162, thus substantially reducing the labor time required to form tool 160 compared to prior art tool 60.

Once screen 164 is attached to porous tool base 162, patterned grid 172 consisting of grid members 174 is placed on top of screen 164 and attached by attachment means 170 (which may be one of several conventional types of attachment means, such as screws). Caulking 176 is used to fill in gaps where grid members 174 fit on top of screen 164 to prevent unwanted buildup of slurry in these gaps during the process of manufacturing.

Figure 14:
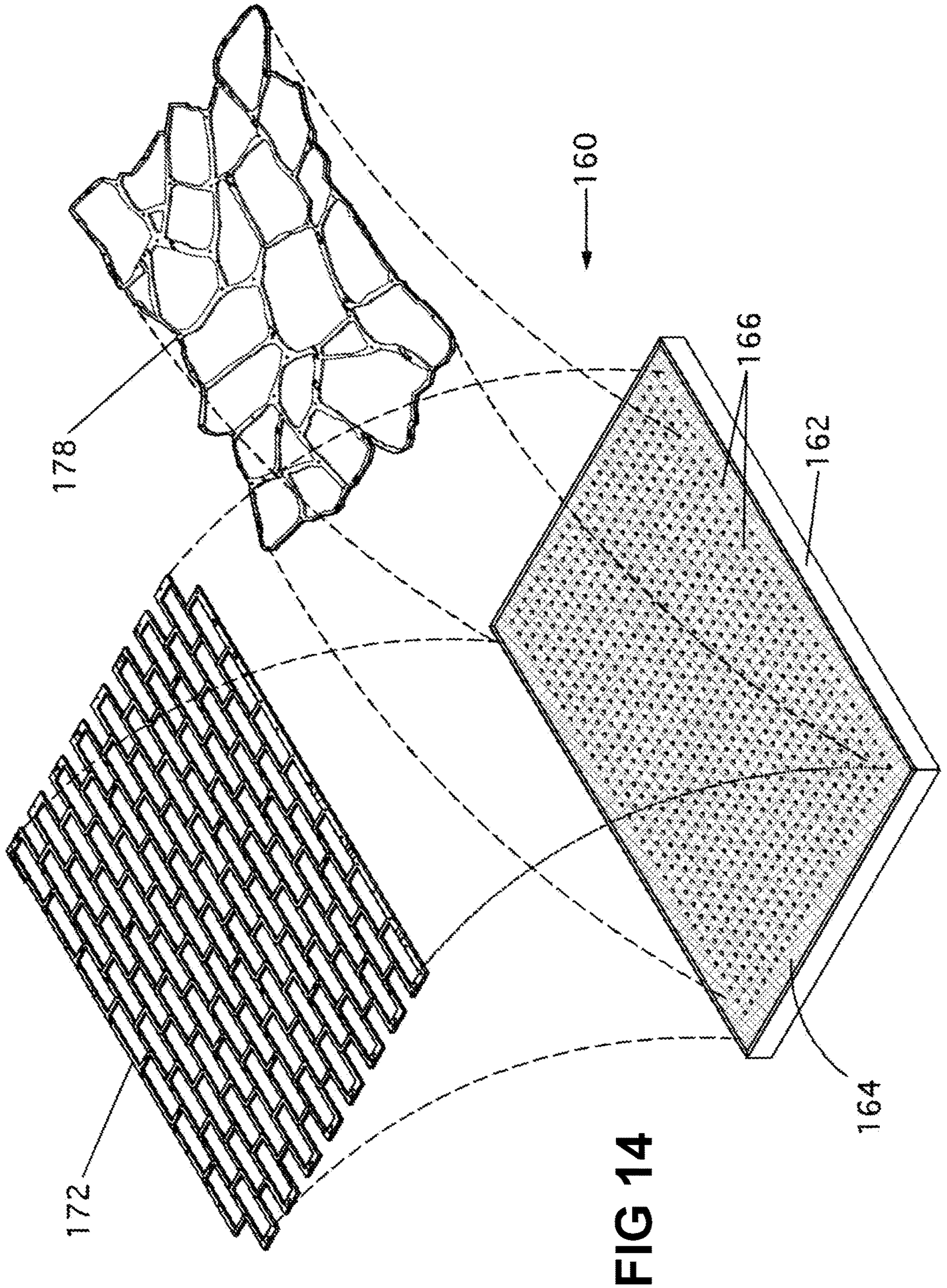
FIG. 14 illustrates how different patterned grids may be used with the same tool base and screen in a fabrication tool according to the present invention.

Grid 172 provides the desired shape of wall covering 10, such as a brick or tile surface. Once the desired wall covering 10 is produced, as illustrated in FIG. 14, patterned grid 172 (which for purposes of illustration is shown in a brick pattern) may be detached from porous tool base 162 and screen 164 and replaced by an alternative patterned grid 178 (which for purposes of illustration is shown in a flagstone grid) and attached as discussed. Thus, tool 160 provides great versatility and may be reused to create a new pattern of wall covering 10. Tool 160 provides a substantial cost and time savings over the prior art tool 60, which requires the creation of a separate new tool, with a poured shaped tool base 62 and a screen 64 shaped to conform to the contours of poured shaped tool base 62 for each design of wall covering 10. Locator peg 180 is used during the die cutting of parts to ensure proper alignment and precise dimensioning of finished wall covering elements.

The buildup of material on the patterned grid 172 is not as thick on the forming screen 164, which advantageously provides finished wall coverings which are more flexible and may be attached to a curving wall, are flatter for digital printing, and flatter for shipping and storing, thus saving space. Patterned grid 172 enables the formation of aesthetic details, for example, the grout lines in a brick or block wall aesthetic wall covering. The inventors have also found that by adding a surplus of pulp surrounding the various patterned grids beyond the intended finished die-cut patterned design of the wall covering solves the problem of parts warping and "potato chipping" as they free dry on the conveyor belt going through the drying oven. The dimensions of the dried parts have to be accurate in order to die cut them properly. Creating aesthetically correct and pleasing wall coverings using slush molding raises problems not found in making the usual packaging products made by slush molding for the packaging industry, in that the wall coverings must fit together precisely with high tolerance in dimensions and detail. Porous screen tool base 162, flat screen 164, and patterned grid 172 in combination comprise the improved tool 160 according to the present invention.

The advantages provided by the improved fabrication tool in accordance with the present invention for slush molding of aesthetic wall coverings include the ability to have consistent production with dimensionally accurate parts; providing a flat front surface when the detail is required; providing better control over part finishing in that the parts lay flat for printing and shipping; reduced tooling costs; reduced wear and tear on the tooling; and reduction in energy use and material waste during production.

The foregoing descriptions of exemplary embodiments of the present invention and the methods of manufacture have been presented for purposes of enablement, illustration, and description. It is not intended to be exhaustive of or to limit the present invention to the precise forms discussed. There may be, however, other wall covering methods of manufacture, fabrication tools, and molded pulp products not specifically described herein, but with which the present invention is applicable. The present invention should therefore not be seen as limited to the particular embodiments described herein; rather, it should be understood that the present invention has wide applicability with respect to molded pulp products. Such other configurations can be achieved by those skilled in the art in view of the description herein. Accordingly, the scope of the invention is defined by the following claims.

The invention claimed is:

1. A tool for use in making aesthetic wall coverings by pulp molding comprising:

a flat tool base;

a flat screen attached to said base; and a patterned grid removably attached to said tool base in a position over said flat screen.

2. The tool according to claim 1, wherein said tool base is porous.

3. The tool according to claim 1, wherein said patterned grid is comprised of a plurality of grid members forming a pattern.

4. The tool according to claim 1, further comprising a locator element.

5. The tool according to claim 4 where said locator element is a peg extending out from said flat screen.

6. The tool according to claim 1, wherein said patterned grid is configured to replicate cement block, brick, or tile.

7. The tool according to claim 1, further comprising caulk located on said flat screen and adjacent to said patterned grid.

8. The tool according to claim 1, wherein said tool base is made of steel or aluminum.

9. The tool according to claim 1, wherein the flat screen is made of material comprising copper.

10. The tool according to claim 1, wherein said tool base further comprises a plurality of drain holes.

* * * * *